Patented Mar. 10, 1925.

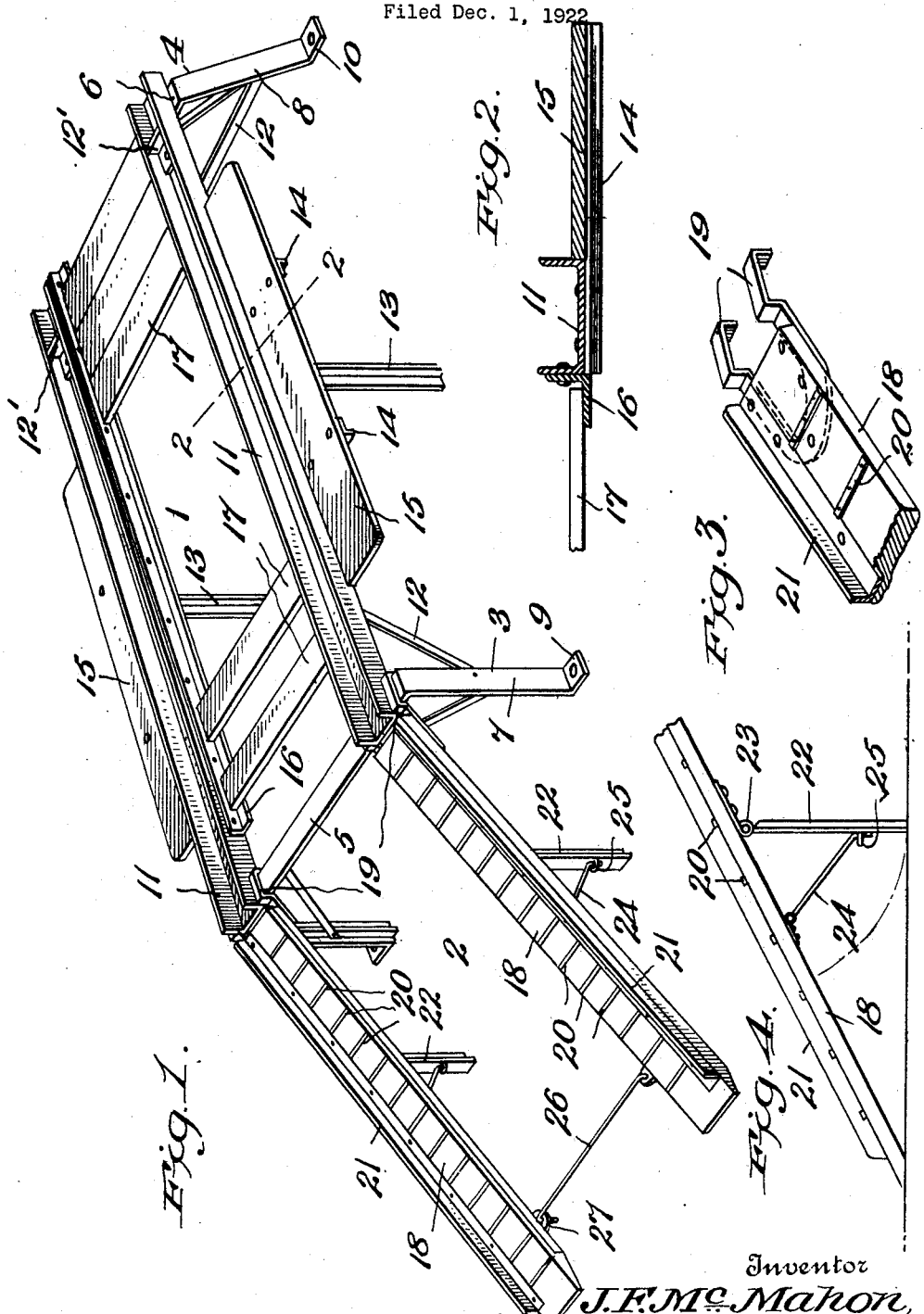

1,528,934

UNITED STATES PATENT OFFICE.

JOHN FRANCIS McMAHON, OF NEW YORK, N. Y., ASSIGNOR TO YELLOW TAXI CORP., OF NEW YORK, N. Y., A CORPORATION OF NEW YORK.

REPAIR STAND FOR VEHICLES.

Application filed December 1, 1922. Serial No. 604,231.

*To all whom it may concern:*

Be it known that I, JOHN FRANCIS MC-MAHON, a citizen of the United States, residing at New York city, county of Bronx, State of New York, have invented a new and useful Improvement in Repair Stands for Vehicles, of which the following is a specification.

The invention relates to new and useful improvements in automobile repair stands and has for its primary object to provide a device of this character for supporting an automobile above the floor so as to make it convenient and comfortable for a mechanic working at the under part of the automobile.

A further object of the invention is to provide a strong and rigid device of this character having an adjustable portion so as to facilitate the work upon automobiles of various makes.

With these and other objects in view the invention resides in the novel details of construction and combination of parts as will be more fully hereinafter described and particularly pointed out in the appended claims.

Referring to the drawings forming a part of this specification in which like numerals designate like parts in all the views:—

Figure 1 is a perspective view of the invention ready for use.

Figure 2 is an enlarged cross sectional view taken on the line 2—2 of Figure 1.

Figure 3 is a detail perspective view of the upper end portion of one of the incline runways and Figure 4 is an enlarged detail side elevational view of a portion of one of the incline runways.

Referring to the drawings in detail, 1 designates the stand and 2 the inclined runway leading thereto.

The stand comprises the supports or end frames 3 and 4, each of which are made of one continuous piece of heavy structural steel, bent to provide the top cross pieces 5 and 6 and the legs 7 and 8. The lower ends of the legs are provided with the foot portions 9 and 10, which are drilled as shown so that the stand may be anchored to the floor to prevent "riding" of the entire stand when a car is driven thereon. A pair of parallel horizontal channel iron tracks 11 are securely mounted at each end to the cross pieces 5 and 6 of the supports and these tracks are of sufficient length and width to accommodate the various sizes and makes of automobiles or other vehicles. The tracks are further secured to the supports by means of the brace pieces 12 so as to give strength and rigidity to the stand. 12' designates stops mounted within the track adjacent one end to limit the movement of an automobile and prevent it from going off the end of the stand. 13 designates a pair of intermediate supports secured to the under portion of the tracks and located midway between the end supports 3 and 4. These supports are also formed of heavy structural steel and are provided to take up the spring in the tracks and to also give rigidity to the stand. Secured to the under side of the tracks and projecting horizontally from the outer sides thereof are a pair of angle bars 14 to which are secured the wooden boards providing work shelves 15 and secured to the inner sides of the track is a pair of horizontally arranged heavy angle bars 16 which run substantially the full length of the stand. These angles are opposed to each other and are arranged for supporting a plurality of cross boards 17 which are adjustably mounted on the angles so that they may be utilized for supporting the lifting jacks when brought into use.

To take care of any lateral thrust and thus prevent the stand from tipping over sideways when the mechanics step on either side thereof, the legs 8 of the end support 4 are angularly extended as shown.

The inclined runway 2 for running an automobile upon the stand comprises a pair of boards 18, each of which has its upper end provided with a pair of cleats 19 for detachably connecting the boards to the stand. These cleats are arranged to engage the cross piece 5 of the support 3 adjacent each side of the tracks 11 and thus prevent any lateral movement of the runway when the same is in use. The boards 18 are made of heavy timber and are provided on their upper face with a plurality of parallel steel cross strips 20 to provide a non-slip surface thereon. Steel angle bars forming guides 21 are also secured to upper face of the boards along the outer edge thereof. 22 designates supports secured to the lower face of inclined boards to prevent any spring in the boards and to give rigidity thereto.

These supports are hingedly connected as at 23 to the boards so that they may be swung against the face of the board when not in use and when adjusted to use they are securely held in position by means of the hooks 24 engaging the keepers 25 on the supports. To prevent the lower ends of the runway from spreading, a hook 26, pivotally mounted on one of the inclined boards and engaging a keeper 27 in the other of the boards, is provided as shown.

From the foregoing it is obvious an automobile may be readily run up the inclined runway and onto the stand. The wheels will rest in the channel iron tracks over the braced end supports, so that great rigidity and firmness is secured and free ingress and egress is provided for mechanics to conveniently work beneath the automobile.

It is obvious that those skilled in the art may vary the details of construction and arrangement of parts without departing from the spirit of my invention, and, therefore, I do not wish to be limited to such features, except as may be required by the claims.

What I claim is—

1. A repair stand for vehicles comprising a plurality of supports, a pair of parallel channel iron tracks mounted on said supports, angle iron bars mounted on the inner side of said tracks, cross boards adjustably mounted on said angle iron bars and an incline leading to said stand and detachably connected thereto.

2. A repair stand for vehicles comprising a plurality of supports, a pair of parallel channel iron tracks mounted on said supports, work shelves mounted on the outer side of said tracks, adjustable cross boards mounted on the inner side of said tracks, an incline leading to said stand and cleats mounted on the upper end of the incline and detachably engaging one of said supports.

3. A repair stand for vehicles comprising a plurality of supports, a pair of parallel channel iron tracks mounted on said supports, work shelves mounted on the outer side of said tracks, angle iron bars mounted on the inner side of said tracks, cross boards adjustably mounted on said angle iron bars and an incline leading to said stand and comprising a pair of boards and cleats mounted on the upper ends of said boards and detachably engaging one of said supports.

In testimony whereof, I have signed my name to this specification in the presence of two subscribing witnesses, this sixth day of November, 1922.

JOHN FRANCIS McMAHON.

Witnesses:
E. M. YAHE,
LAURA E. SMITH.